United States Patent [19]

Sato et al.

[11] 4,393,697

[45] Jul. 19, 1983

[54] AIR FLOW RATE MEASURING APPARATUS

[75] Inventors: Kanemasa Sato; Sadayasu Ueno; Kazuhiko Miya, all of Ibaraki, Japan

[73] Assignee: Hitachi, Ltd., Tokyo, Japan

[21] Appl. No.: 229,838

[22] Filed: Jan. 30, 1981

[30] Foreign Application Priority Data

Jan. 31, 1980 [JP] Japan .................................. 55-11345

[51] Int. Cl.³ .......................................... G01M 15/00
[52] U.S. Cl. ....................................... 73/118; 73/204
[58] Field of Search .................... 73/118, 204; 338/315

[56] References Cited

U.S. PATENT DOCUMENTS 3,824,966 7/1974 Schneider et al. .
4,080,821 3/1978 Johnston .............................. 73/27 R
4,254,659 3/1981 Benedetto et al. ................ 73/204 X
4,264,961 4/1981 Nishimura et al. ................ 73/204 X

FOREIGN PATENT DOCUMENTS 52-113432 9/1977 Japan .

Primary Examiner—Jerry W. Myracle
Attorney, Agent, or Firm—Antonelli, Terry & Wands

[57] ABSTRACT

An air flow rate measuring apparatus having an air flow sensor and a temperature sensor which are disposed in a passage for intake air formed in the vicinity of a main air flow guide chamber in an internal combustion engine. The electric characteristics of the air flow sensor vary with the flow rate of air flowing by the sensors. The air flow sensor and temperature sensor have the same shape and the same construction. The temperature sensor is used to compensate the temperature of the air flow sensor so as to maintain the air flow sensor at a predetermined temperature. These sensors are arranged in the same plane that is at right angles to the direction in which said intake air flows. The sensors are extended parallel to each other in symmetrical relationship with respect to the center line in the above-mentioned plane. Conductor support pins to which the sensors are fixed are also arranged symmetrically with respect to the center line in the mentioned plane.

15 Claims, 7 Drawing Figures

AIR FLOW RATE MEASURING APPARATUS

BACKGROUND OF THE INVENTION

This invention relates to an air flow rate measuring apparatus used especially for measuring the flow rate of air being sucked into an internal combustion engine.

In a conventional air flow rate measuring apparatus of this kind disclosed in, for example, U.S. Pat. No. 3,824,966, the temperature of a thin air flow sensor is maintained at a predetermined level by means of a temperature sensor and a temperature controlling electric circuit.

Such an air flow sensor is adversely affected by thermal disturbance occurring due to heat transmitted thereto through a supporting member consisting of, for example, metal. The thermal disturbance results in an error in the measurement of the flow rate of air.

Another type of conventional air flow rate measuring apparatus is disclosed in, for example, U.S. Pat. No. 4,121,549. In this apparatus, an air flow sensor is provided in a by-pass branched from a main duct but no consideration is given to the influence of heat upon the air flow sensor.

SUMMARY OF THE INVENTION

An object of the present invention is to provide an air flow rate measuring apparatus with improved accuracy.

In order to achieve the above object, the present invention provides the air flow rate measuring apparatus having an air flow sensor and a temperature sensor which are arranged in the same plane that is at right angles to the direction intake air flows. This air flow rate measuring apparatus permits generating a stable output unlike the above-described conventional flow rate measuring apparatus in which outputs from the air flow sensor provided on the downstream side varies due to the influence of turbulent flow which occurs when the intake air impinges upon the temperature sensor provided on the upstream side. Therefore, an air flow rate measuring apparatus according to the present invention permits improving the flow rate measuring accuracy.

DESCRIPTION OF THE PREFERRED EMBODIMENTS

Figure 1:
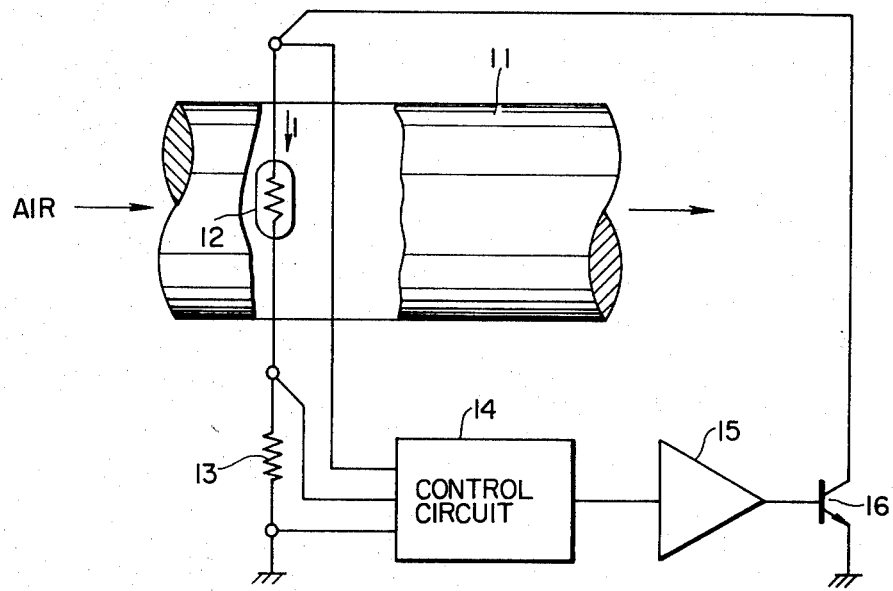
FIG. 1 illustrates the principle of measuring flow rate of air being sucked into the engine.

FIG. 1 illustrates the principle of a method of measuring the flow rate of intake air with an air flow sensor.

An air flow sensor 12 is provided in a passage 11 in which intake air flows. The electric characteristics of the flow sensor 12 vary with the flow rate or velocity of the intake air. The air flow sensor 12 is grounded through a resistor 13. The air flow sensor 12 and resistor 13 form two arms of a resistance bridge circuit, and the remaining two arms thereof are included in a control circuit 14. A voltage generated across the resistor 13 is applied to the control circuit 14. An output from the control circuit 14 is amplified by an amplifier 15 so as to be utilized for controlling a power transistor 16. An electric current I flowing through the air flow sensor 12 in an electric circuit shown in FIG. 1 is picked up by the resistor 13. The electric current I is controlled by the control circuit 14 and transistor 16 so as to maintain the temperature of the air flow sensor 12 at a constant level. In this case, the electric current I and air flow rate Q have the relation expressed by King's formula:

$$I^2 = (C_1 + C_2 \sqrt{Q})(tw - ta)S$$

wherein $C_1$, $C_2$ and S are coefficients, tw the temperature of the air flow sensor, and ta the temperature of air detected by a temperature sensor (not shown). Accordingly, the flow rate Q of air flowing by the air flow sensor 12 can be measured by detecting the electric current I.

The above-described method of detecting the flow rate of intake air is based on a technique for controlling the temperature of the sensor 12 to a fixed level or keeping constant the temperature of the sensor 12 throughout a flow rate measuring operation. In a case where the flow rate of intake air is measured while controlling the temperature of the air flow sensor to a fixed level, the air flow sensor responds more quickly than in a case where the measurement is conducted while controlling the electric current to a fixed level.

Figure 2:
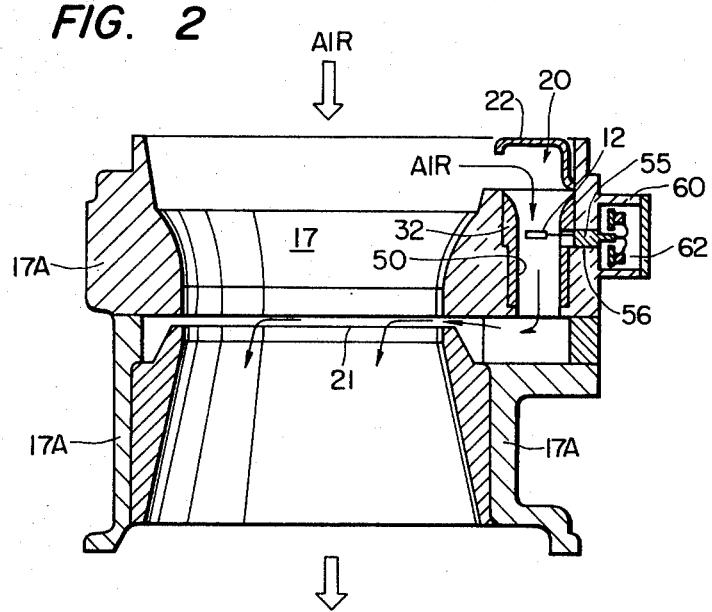
FIG. 2 is a sectional view of an embodiment of the present invention.

FIG. 2 shows the structure of an air flow rate measuring apparatus according to the present invention.

A main venturi 17 is connected to a throttle chamber (not shown) provided on the downstream side thereof. A fuel injector (not shown) in the throttle chamber is adapted to inject fuel toward the downstream side of a throttle valve (not shown). The air flowing into the main venturi 17 in the direction of the arrows in the drawing is supplied from an air filter (not shown) provided on the upstream side thereof, and air-fuel mixture produced by the injection of fuel into the intake air is introduced through the throttle valve into cylinders of the engine. A part of the intake air flowing toward a narrowed portion of the main venturi 17 enters a by-pass 20 as shown by an arrow in FIG. 2. The by-pass 20 is formed in a venturi chamber body 17A (main air flow guide chamber body) defining the main venturi 17. The air flowing through the by-pass 20 enters the main venturi 17 through a circular slit 21, which is formed in the inner wall of the venturi 17, due to the difference between the air pressure at the entrance of the by-pass 20 and that in the slit 21.

An air flow guide member 32 consisting of a metal or an insulating material is provided on the upstream side of the air flow sensor 12 so as to allow the air to flow uniformly. It is preferable that the opening in the air flow guide member 32 has a circular cross section. Accordingly, it is also preferable that the by-pass 20 has a circular cross section. A dust cover 22 has an area larger than the cross-sectional area of a topmost portion of the opening in the air flow guide member 32 so that dust floating in the intake air does not enter the by-pass 20.

The air flow sensor 12 is fixed to a heat insulating support member 55 which is in the form of a block. The block type support member 55 is inserted through a bore 56 provided in the main venturi chamber body 17A, and through the wall of the air flow guide member 32 such that the distal end surface of the support member 55 is flush with the inner surface of the guide member 32. Accordingly, the air flow sensor 12 fixed to the support member 55 can be positioned in the by-pass 20. A housing 60 contains an electric circuit 62 for actuating and controlling the air flow sensor 12.

Figure 3A:
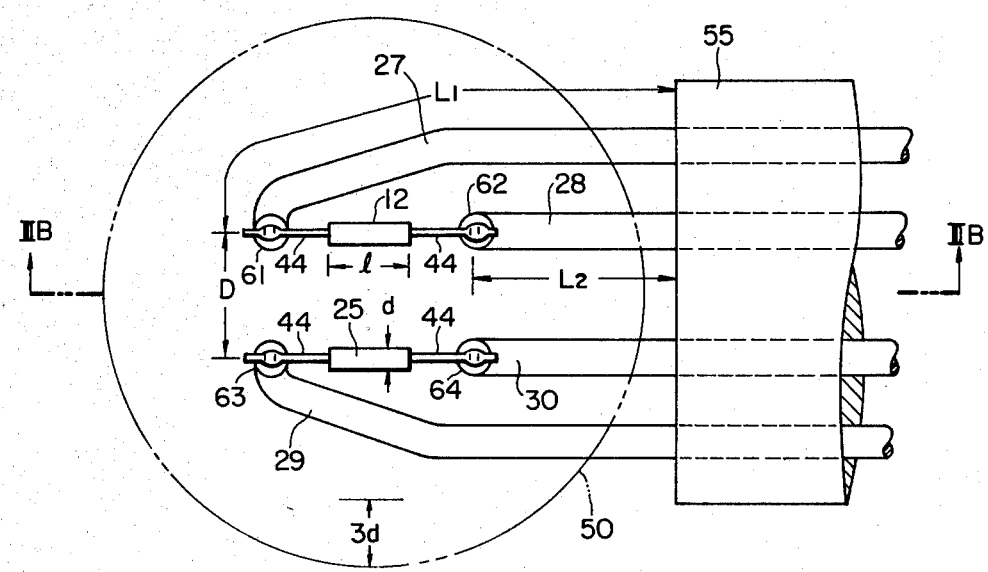
FIG. 3A is a front elevational view of the principal portion of the embodiment shown in FIG. 2, which includes an air flow sensor, a temperature sensor, a part of each conductive support pin, and a part of a support member.
Figure 3B:
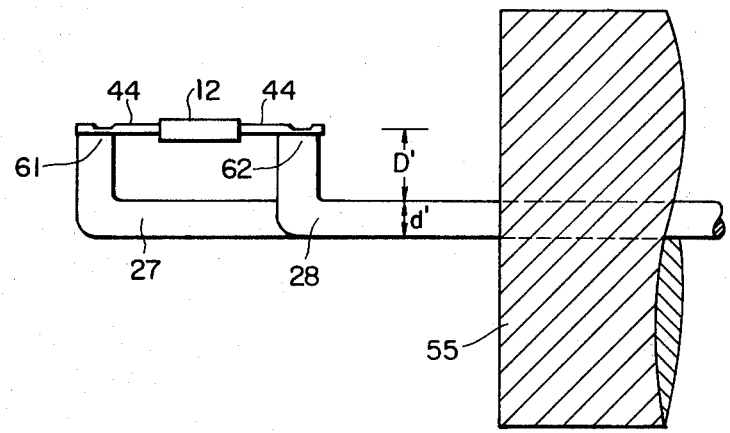
FIG. 3B is a side elevational view of the principal portion shown in FIG. 3A.
Figure 4:
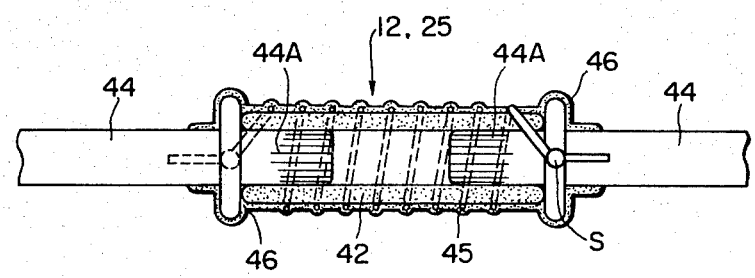
FIG. 4 is an enlarged front elevational view partially in section of the air flow sensor or the temperature sensor shown in FIG. 3A, which illustrates the detailed structure thereof.

FIGS. 3A and 3B are enlarged front and side elevational views, respectively, of the air flow sensor 12 shown in FIG. 2 and a temperature sensor 25 which is not shown in FIG. 2. Each sensor 12 and 25 consists of a coil wound around a miniaturized bobbin as shown in FIG. 4 which will be described later. The sensors 12 and 25 are provided in the same plane that is at right angles to the direction in which a fluid, i.e. intake air flows through the by-pass 20 provided parallel to the axis of the main air flow guide chamber body 17. Owing to such an arrangement, an air flow rate measuring apparatus according to the present invention permits generating a stable output unlike a conventional apparatus of this kind in which an output from an air flow sensor provided on the downstream side varies due to the influence thereupon of a turbulent flow which occurs when the intake air impinges upon a temperature sensor provided on the upstream side.

The sensors 12, 25 in the present invention are provided in the same plane in the by-pass 20 that is at right angles to the direction in which the fluid flows, and the sensors 12, 25 are parallel to each other and have symmetrical relationship with respect to the center line on the above-mentioned plane. The sensors 12, 25 have the same specification. In other words, they have the same shape, the same specific heat and the same thermal conductivity. Conductive support pins 27, 28 for supporting the air flow sensor 12 and conductive support pins 29, 30 for supporting the temperature sensor 25 are disposed symmetrically with respect to the center line referred to above. Base portions of the conductive support pins 27, 28, 29, 30 are firmly fitted in the support member 55. The conductive support pins 27, 28, 29, 30 are adapted to support at one end portion of each thereof the air flow sensor 12 and temperature sensor 25 and connected at the other end portion of each thereof to the control circuit 14 shown in FIG. 1.

Let $L_1$ and $L_2$ equal the length of the conductive support pin 27 or 29, and the length of the conductive support pin 28 or 30, respectively. The total length L of each pair of pins 27, 28; 29, 30 is $L=L_1+L_2$. The total length of the conductive support pins 27, 28 for the air flow sensor 12 and the total length of the conductive support pins 29, 30 for the temperature sensor 25 are equal to each other. Since the sensors 12, 25 and the conductive support pins 27, 28, 29, 30 are arranged in the above-described manner, the sensors 12, 25 are equally influenced by the heat from the wall of the main air flow guide chamber body 17A. This allows any decrease in the air flow rate measuring accuracy to be minimized. The air flow sensor 12 and temperature sensor 25 are joined to the conductive support pins 27, 28, 29, 30 via lead wires 44. When each lead wire 44 consists of an alloy of platinum and iridium and each support pin 27, 28, 29, 30 consists of a stainless steel rod, they can be easily joined together by spot welding.

The sensors 12, 25 are supported on the conductive support pins 27, 28, 29, 30 in such a manner as illustrated in FIG. 3B. The support pins 27, 28; 29, 30 joined to both end portions of the sensors 12, 25 and extended into the fluid to be measured are bent at their respective end portions 61, 62, 63, 64 toward the upstream side of the flow of the fluid and along the axis of the by-pass 20. The end portions 61, 62; 63, 64 are fixed to the air flow sensor 12 and temperature sensor 25, respectively, by spot welding.

Let D and d equal the horizontal distance between the air flow sensor 12 and temperature sensor 25, and the outer diameter of the sensors 12, 25, respectively. The shortest horizontal distance between the air flow sensor 12 and a inner surface 50 of the by-pass 20, or the shortest horizontal distance between the temperature sensor 25 and the inner surface 50 is set to a level greater than $3d$. Furthermore, it is necessary that the horizontal distance D and the shortest distance 3d be set such as to satisfy the dimensional condition $D>3d$.

Let $D'$ and $d'$ equal the length at which the end portions 61, 62, 63, 64 of the conductive support pins 27, 28, 29, 30 extend parallel to the axis of the by-pass 20, and the outer diameter of the conductive support pins 27, 28, 29, 30. The length $D'$ is set such as to satisfy the dimensional condition $D'>3d'$.

When the conductive support pins 27, 28, 29, 30 and sensors 12, 25 are arranged so as to satisfy the dimensional condition $D>3d$, the temperature of the temperature sensor 25 can be prevented from being increased by the heat radiated from the air flow sensor 12 the temperature of which is controlled to a predetermined level (135°). As may be understood from King's formula, when (tw−ta) is maintained at a predetermined level, the accuracy of measuring a flow rate Q can be improved. When the dimensional condition $D'>3d'$ is satisfied, the lead wires 44 can be easily joined to the conductive support pins 27, 28, 29, 30 by spot welding.

FIG. 4 shows the detailed structure of the air flow sensor 12 (temperature sensor 25) used in the various embodiments of this invention.

A hollow cylindrical base 42 consists of, for example, glass or ceramics. Each of the lead wires 44 consists of, for example, platinum-iridium alloy, or a socalled Dumet wire. Each of the lead wires 44 has a portion 44A the outer diameter of which is slightly smaller than the inner diameter of the cylindrical base 42, and also a flange-like portion having an outer diameter greater than that of the cylindrical base 42. The inner and outer surfaces of the cylindrical base 42 are coated with a film of an insulating material. The portion 44A of each lead wire 44, having an outer diameter smaller than the inner diameter of the cylindrical base 42, is fitted into the hollow therein.

A resistive wire 45 consisting of, for example, platinum, a nickel-chromium alloy, or tungsten-silver alloy is wound around the outer surface of the cylindrical base 42. Both end portions of the wire 45 are connected with the lead wires 44 at points S by, for example, spot welding. It is preferable that the surfaces of the resistive wires 45, a part of each of the lead wires 44, as well as the cylindrical bases 42 be covered with an inorganic insulating material 46, such as glass, which has a resistance to heat, moisture and oxidation. It is necessary that the lead wires 44 and cylindrical bases 42 have substantially the same thermal expansion coefficient. The reason is that the portion of each of the cylindrical bases 42 that is in contact with the lead wire 44 must be protected against unduly high thermal stress which occurs due to repeated variations in temperature caused by repeated operations of the engine and which possibly causes the sensors 12, 25 to be damaged. The sensors 12, 25 have an outer diameter d of 0.6 mm and a length l of 2 mm, and the wires 44 an outer diameter of 0.2 mm. Each of the conductive support pins 27, 28, 29, 30 which are buried at their respective base end portions in the support member 55 has an outer diameter of not more than 0.5 mm, and a total length L of each pair thereof is not more than 10 mm.

Each of the support pins 27, 28, 29, 30 is inserted at its base end portion into the support member 55 which consists of a resin, such that the base end portion of each of the support pins 27, 28, 29, 30 is integrally set in the support members 55. Therefore, according to the present invention, the air flow rate measuring apparatus, in which the support member 55, provided with the air flow sensor 12 and temperature sensor 25 fixed thereto, is air-tightly fitted into a bore 56 provided in the wall 17A defining a passage for the fluid to be measured, can be obtained.

It has been proven by experiments that the air flow rate measuring apparatus according to the present invention of the above-described construction can stand 200 times of backfire or 80 G of vibration in an internal combustion engine.

Figure 5:
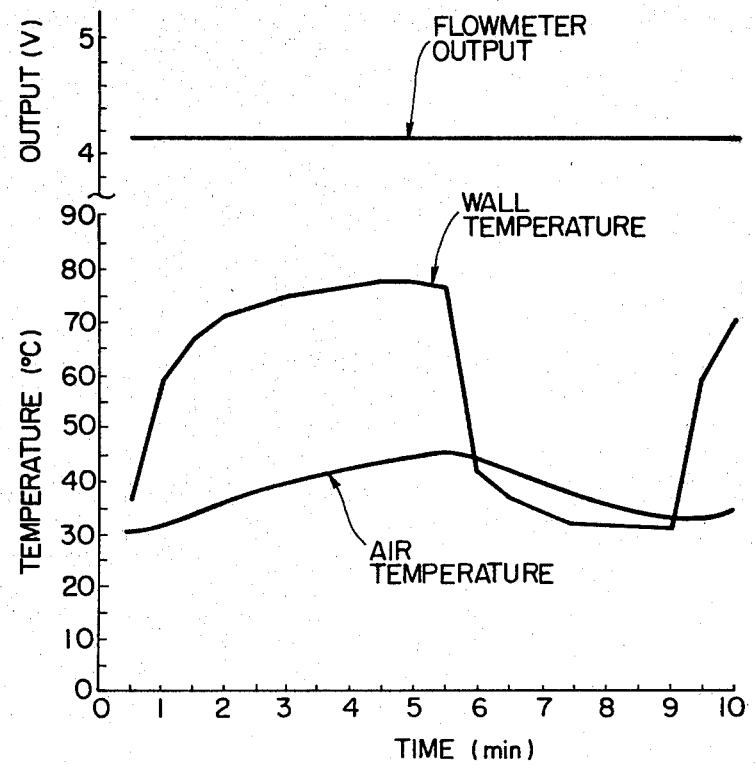
FIG. 5 is a graphical chart showing the temperature characteristics and output characteristics of a flow rate measuring apparatus according to the present invention.

FIG. 5 shows the temperature characteristics and output characteristics of an air flow rate measuring apparatus according to the present invention installed in an engine. The temperature characteristics and output characteristics of the apparatus are determined under the following conditions.

The above apparatus is installed in a 4-cylinder, 4-cycle engine of a displacement of 1800 cc, which is rotated with no load at 2000 r.p.m. In order to determine the temperature characteristics and output characteristics of the apparatus, a housing 60 is locally heated from the outside by a heater. The temperature of the air flowing through a by-pass 20, and the temperature of such a portion of the wall of a main venturi chamber body 17A that supports an air flow sensor 12 and a temperature sensor 25 are measured with thermocouples set in suitable positions. Also, an output from the air flow rate measuring apparatus is measured. Referring to FIG. 5, the graduations on the axis of abscissas represent time (minute), and the graduations on the axis of ordinates temperature (° C.) and output (volt) from the air flow rate measuring apparatus. According to the present invention, an output from the air flow rate measuring apparatus fluctuates around 0.5% when the temperature of the wall of the venturi chamber body 17A is varied by 50° C.

Let $d'$, $l$, and $d$ equal the outer diameter of each of the conductive support pins, the length of the air flow sensor and temperature sensor, and the outer diameter of each of the sensors, respectively, with respect to the experiment in which the data shown in FIG. 5 is obtained. The $d'$, $l$ and $d$ have relation expressed by the equation $L/d' \geq 5l/d$.

When the temperature of the wall of the venturi chamber body is varied by 50° C. in a similar experiment using a conventional air flow rate measuring apparatus and conducted under the same measuring conditions as described above, an output from the apparatus fluctuates around 10%.

Figure 6:
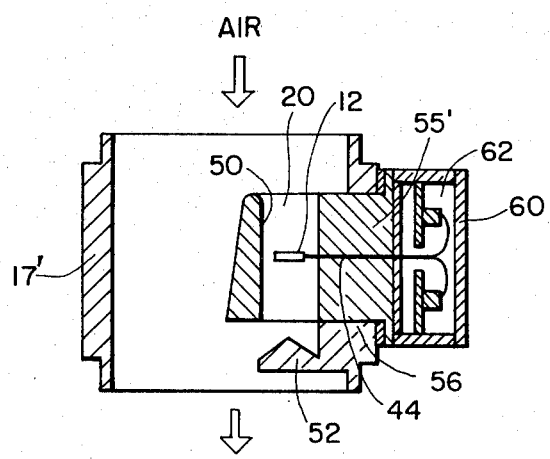
FIG. 6 is a sectional view of another embodiment of the present invention.

FIG. 6 shows another embodiment of the present invention, in which a second chamber body 55' molded with an air flow sensor 12 fitted thereinto and having a channel therethrough can be fitted into a main air flow chamber body 17' from one side thereof. In this embodiment, an electric circuit 62 are formed directly on the second chamber body 55', while a back fire preventing wall is integrally formed with the main air flow guide chamber body 17'. The second chamber body 55' is detachably fitted into the main air flow guide chamber body 17' so that maintenance inspections of the apparatus can be conveniently carried out.

In the embodiment shown in FIG. 6, an air flow sensor 12 and a temperature sensor 25 (not shown) may be directly installed in the main air flow guide chamber body 17', omitting the second chamber body 55'.

The air flow rate measuring apparatus according to the present invention described above has the following effect.

Since the air flow sensor and the temperature sensor are arranged in the same plane which is at right angles to the direction in which intake air flows, a turbulent flow which adversely affects the operation of the air flow sensor never occurs so that the air flow rate measuring accuracy can be improved.

The air flow sensor and temperature sensor are disposed parallel to each other in the same plane that is at right angles to the direction in which fluid flows, and have a symmetrical relationship with respect to a line passing the center of the mentioned plane. The air flow sensor and temperature sensor have the same shape and the same construction. Also, each set of conductive support pins consists of two pins made of the same material and having predetermined shapes, and the conductive support pins are arranged symmetrically. This allows the air flow sensor and temperature sensor to be equally influenced by the heat from the wall of the main air flow guide chamber body. Since the conductive support pins are extended symmetrically as mentioned above in the flow of a fluid, the temperature compensating effect of the temperature sensor with respect to variations in the temperature of the fluid can be improved.

According to the present invention, the heat generated by the air flow sensor has no influence upon the temperature detected by the temperature sensor so that the flow rate measuring accuracy can be remarkably increased.

Owing to the use of miniaturized air flow sensor and temperature sensor, an air flow rate measuring apparatus according to the present invention has excellent quick-response characteristics.

As may be clearly understood from the above, an air flow rate measuring apparatus according to the present invention permits measuring the flow rate of air at a high accuracy.

What is claimed is:

1. An air flow rate measuring apparatus for internal combustion engines, comprising an air flow sensor disposed in a passage through which intake air flows into said engine, and a temperature sensor disposed in said passage and adapted to compensate the temperature of said air flow sensor with respect to the measurement of the flow rate of said intake air, said air flow sensor and said temperature sensor being arranged in the same plane which is at right angles to the direction in which said intake air flows, wherein said air flow sensor and said temperature sensor are fixed at their respective end portions by conductive support pins having the same surface area and the same heat capacity.

2. An air flow rate measuring apparatus according to claim 1, wherein said air flow sensor and said temperature sensor are extended parallel to each other in said plane.

3. An air flow rate measuring apparatus according to claim 1, wherein said air flow sensor and said temperature sensor are disposed symmetrically with respect to any straight line, which is in said plane and passes the center of said plane.

4. An air flow rate measuring apparatus according to claim 1, wherein said air flow sensor and said temperature sensor have the same shape, the same specific heat and the same thermal conductivity.

5. An air flow rate measuring apparatus according to claim 1, wherein said air flow sensor and said temperature sensor are connected at their respective end portions to said conductive support pins via lead wires, each of said conductive support pins having an end portion which is extended perpendicularly from said plane to the upstream of the flow of said intake air and which contacts said lead wire connected to said air flow sensor or said temperature sensor, the horizontal distance D between said air flow sensor and said temperature sensor and the outer diameter d of said sensors being set such that the shortest distance between said air flow sensor or said temperature sensor and the inner surface of a side wall defining said passage is not less than 3d and such that D is greater than 3d, the distance D' at which the end portions of said conductive support pins are extended to the upstream of the flow of said intake air and the outer diameter d' of said support pins being set such that D' is greater than 3d'.

6. An air flow rate measuring apparatus according to claim 1, wherein said air flow sensor and said temperature sensor are connected at their respective end portions to said conductive support pins via lead wires, the total length L of each set of said conductive support pins, the outer diameter d' of said conductive support pins, the length l of said sensors, and the outer diameter d of said sensors being set such that L/d' is equal to or greater than 5l/d.

7. An air flow rate measuring apparatus according to claim 1, wherein said passage for said intake air is provided with a chamber so as to allow a part of said intake air to flow therethrough, said air flow sensor and said temperature sensor being arranged in said chamber.

8. An air flow rate measuring apparatus according to claim 1, wherein said passage for said intake air is provided with a by-pass so as to allow a part of said intake air to flow therethrough, said air flow sensor and said temperature sensor being arranged in said by-pass.

9. An air flow rate measuring apparatus according to claim 8, wherein said passage is provided with a back fire preventing member positioned to prevent said air flow sensor and said temperature sensor from being exposed directly to back fire.

10. An air flow rate measuring apparatus according to claim 1, wherein said air flow sensor comprises:
a base member made of an electrically-insulating material;
a temperature-dependent resistive element made of an electrically-conductive material and formed on a surface of said base member;
a pair of lead wires made of an electrically-conductive material, fixed to respective ends of said base member, and connected to said resistive element electrically; and
a pair of support pins made of an electrically-conductive material, fitted in a support member, and fixed to said lead wires;
whereby the cross-sectional area of said lead wires is smaller than the cross-sectional area of said support pins.

11. An air flow rate measuring apparatus for internal combustion engines, comprising an air flow sensor disposed in a passage through which intake air flows into said engine, and a temperature sensor disposed in said passage and adapted to compensate the temperature of said air flow sensor with respect to the measurement of the flow rate of said intake air, said air flow sensor and said temperature sensor being arranged in the same plane which is at right angles to the direction in which said intake air flows, wherein said passage is provided with a back fire preventing member positioned to prevent said air flow sensor and said temperature sensor from being exposed directly to backfire.

12. An air flow rate measuring apparatus for internal combustion engines, comprising an air flow sensor disposed in a passage through which intake air flows into said engine, and a temperature sensor disposed in said passage and adapted to compensate the temperature of said air flow sensor with respect to the measurement of the flow rate of said intake air, said air flow sensor and said temperature sensor being arranged in the same plane which is at right angles to the direction in which said intake air flows, wherein said passage for said intake air is provided with a venturi chamber having an annular recess surrounding the narrowest portion thereof and a by-pass so as to allow a part of said intake air to flow therethrough, said annular recess being positioned at an outlet of said by-pass, and said air flow sensor and said temperature sensor being arranged in said by-pass.

13. An air flow rate measuring apparatus according to claim 12, wherein said air flow sensor and said temperature sensor are extended parallel to each other in said plane.

14. An air flow rate measuring apparatus according to claim 12, wherein said air flow sensor and said temperature sensor are disposed symmetrically with respect to any straight line, which is in said plane and passes the center of said plane.

15. An air flow rate measuring apparatus according to claim 12, wherein said air flow sensor and said temperature sensor have the same shape, the same specific heat and the same thermal conductivity.

* * * * *